United States Patent Office 3,317,276
Patented May 2, 1967

3,317,276
STABILIZED AMMONIUM NITRATE COMPOSITIONS AND THEIR PRODUCTION
Marion Lipscomb Brown, Jr., Albert Wise Green, and Elmer Ladelle Blanton, all of Yazoo City, Miss., assignors to Mississippi Chemical Corporation, Yazoo City, Miss., a corporation of Mississippi
No Drawing. Filed Oct. 24, 1966, Ser. No. 588,754
29 Claims. (Cl. 23—103)

ABSTRACT OF THE DISCLOSURE

Stabilized ammonium nitrate in crystallized mixture with an amount of boric acid or a salt thereof sufficient to substantially reduce the physical sensitivity of the ammonium nitrate to II–IV and/or III–IV crystal type transitions, the mixture preferably also including ammonium or diammonium phosphate or ammonium sulfate, or both, and its use in particulate ammonium nitrate production to reduce dust formation.

---

This invention relates to stabilized ammonium nitrate compositions and to processes for their production. This is a continuation-in-part of application S.N. 439,438, filed Mar. 12, 1965.

The invention sought to be patented, in one composition aspect, resides in the concept of substantially pure ammonium nitrate as a crystallized mixture with boric acid, an alkali-metal salt thereof, an ammonium salt thereof, or a mixture thereof, in an amount sufficient to substantially reduce the sensitivity of the ammonium nitrate to II–IV and/or III–IV crystal type transitions. In another composition aspect, the ammonium nitrate compositions are in the form of a crystallized mixture comprising (a) boric acid, an alkali-metal salt thereof, an ammonium salt thereof, or a mixture thereof, plus (b) monoammonium or diammonium phosphate, and preferably also up to about 1 percent diammonium sulfate.

The invention sought to be patented, in its process aspect, resides in the concept of stabilizing substantially pure ammonium nitrate by crystallization from a liquid mixture with boric acid, an alkali-metal salt thereof, an ammonium salt thereof, or a mixture thereof in an amount sufficient to substantially reduce the sensitivity of the ammonium nitrate to II–IV and/or III–IV crystal type transitions. In another process aspect, ammonium nitrate compositions comprising monoammonium or diammonium phosphate are crystallized from a liquid mixture comprising (a) boric acid, an alkali-metal salt thereof, an ammonium salt thereof, or a mixture thereof, plus (b) monoammonium or diammonium phosphate, and preferably also up to about 1 percent diammonium sulfate.

The tangible embodiments of the composition aspect of this invention are characterized by improved physical stability, i.e., greater hardness and resistance to caking, lower moisture sensitivity and/or breakdown in particle size, particularly when subjected to repeated passage through the III–IV crystal type transition temperature. In the preferred compositions the II–III, II–IV and III–IV crystal transitions have been substantially eliminated.

The process aspect of this invention when performed is characterized by reduced production of the undesired fines and dust normally produced when ammonium nitrate or compositions comprising it are rapidly heated or cooled through the II–IV crystal type transition temperature range. In the preferred aspects, the physical breakdown of the ammonium nitrate due to II–III, II–IV and III–IV crystal transitions is substantially eliminated.

As used herein, "particulate" ammonium nitrate means in the form of separate, discrete macroparticles, e.g., prills, granules and pellets, preferably prills, as opposed to powdered ammonium nitrate or solutions thereof. "Fines" and "dust" refer to the very small particles of ammonium nitrate, e.g., of −20 mesh, −30 mesh and smaller, normally associated with the production of granular, pelleted and prilled ammonium nitrate. "Ammonium salts of phosphoric and sulfuric acid" refer to all molar combinations of ammonia and these acids, including the polymeric forms thereof, e.g., monoammonium phosphate, diammonium phosphate and diammonium sulfate.

The change in crystal type which normally occurs when ammonium nitrate passes through 184° F. (II–III), 90° F. (III–IV), and rapidly through the 113–124° F. (II–IV) range results in a breakdown of larger particles (+20 mesh and larger) into smaller particles. In commercial production of prilled, granulated and pelletized ammonium nitrate, such smaller particles, i.e., dust or fines, must be separated from the product and reprocessed in the plant. In prilled ammonium nitrate production, the dust is separated and then redissolved as a weak liquor solution. Evaporators then remove this water, which increases the cost of the process. The recovered ammonium nitrate is then re-prilled after evaporation, thereby increasing the load on the prilling tower, and the drying and cooling drums, which reduces the capacity of the plant. Thus, any reduction in the amount of dust produced in the plant provides a corresponding increase in the capacity of a given plant and decreases the cost of operation.

In the prilling process, ammonium nitrate solution at 280° F. or above is sprayed in a prilling tower countercurrent to cooling air which solidifies the droplets into prills which are ultimately cooled to ambient temperature. Thus, the prills pass through the 257°, 184° and 90° F. transition temperatures. Ordinarily, the prills contain residual moisture and are dried with hot air. Thus, in commercial production, the prills are often passed rapidly through the 113–124° F. Type II–IV transition range more than once. Passage of the prills through these transition points produces cracked prills and formation of finely divided powder in the prilling tower and drying cooling drums and weakens the structure of the unbroken prills so that they readily break on subsequent handling. A similar problem exists in the production of particulate fertilizer compositions comprising ammonium nitrate.

Even though elaborate equipment is used to remove the undesired fines or dust from the commercial product, some is nevertheless carried over. In some plants, the prills or granules are bagged at above 90° F. so that the crystals pass through the 90° F. transition point within the bag, causing some cracked prill and dust formation. However, the most complete physical breakdown of the ammonium nitrate compositions comprising it occurs on storage during the summer months as a result of the ammonium nitrate repeatedly being passed through the 90° F. transition temperature, e.g., 200 or more times in one year. This causes extensive formation of dust and granules or prills with cracks and/or a weak grainy structure. Therefore, even if all such dust were absent from the product when originally packaged, it will subsequently be formed on handling and during storage. Ten percent or less cracked prills produce a marked deterioration in the physical properties of the product.

The most serious consequence of the physical instability of particulate ammonium nitrate when used as a fertilizer is its tendency to turn into a solid, hard cake during storage. Even when this does not occur, the fines and dust produced make the product more difficult to handle and use and thus reduces the quality thereof.

When ammonium nitrate is used as a propellant component, its tendency to break down on storage produces cracks in or crumbling of cast propellant or alteration of particle size of particulate propellant. This undesirably and often dangerously alters the burning characteristic thereof. When used as an explosive, e.g., mixed with oil or other explosive component, cracking, powdering and caking of particulate ammonium nitrate can have a profoundly adverse effect upon its utility as an explosive.

Many materials have been used to increase the physical stability of ammonium nitrate and compositions comprising ammonium nitrate, including natural phosphates, potassium metaphosphate, mono- and diammonium phosphate, ammonium sulfate, potassium chloride, magnesium salts, calcium salts, sodium silicate, clays, sodium, calcium and potassium nitrates, iron cyanides, copper oxides, etc. See, e.g., U.S. Patents 1,406,455, 1,698,793, 1,868,-890, 1,932,434, 1,939,165 1,947,601, 1,966,947, 2,124,332, 2,136,069, 2,657,977, 2,702,747, 2,879,133, 2,901,317, 2,943,928, 2,957,763, 3,007,773, 3,018,164, 3,021,207, 3,026,193, 3,030,179, 3,034,853, 3,034,858, 3,070,435, 3,116,108, 3,117,835, and 3,148,945.

Despite the many materials used in an attempt to improve the physical stability of ammonium nitrate compositions, the problem of product instability and dust formation still exists in commercial production of particulate ammonium nitrate, especially prilled and granular ammonium nitrate. Materials which modify one or more of the crystal type transitions of ammonium nitrate often create other problems. The physical breakdown of particulate ammonium nitrate on storage remains a serious problem.

It is therefore an object of this invention to provide a process for the production of crystalline ammonium nitrate and compositions comprising crystalline ammonium nitrate in which the amount of dust and fines concurrently produced is reduced.

Another object is the elimination of 184° F. II–III crystal type transition in particulate ammonium nitrate and ammonium nitrate composition production.

Another object is to provide a process for the production of better quality particulate ammonium nitrate and ammonium nitrate and ammonium nitrate compositions.

A further object is the provision of ammonium nitrate and ammonium nitrate compositions of improved physical stability.

Other objects will be apparent to those skilled in the art to which this invention pertains.

The following is a description of the manner and process of making and performing the invention, with particular reference to substantially pure ammonium nitrate.

The starting liquid ammonium nitrate used in the process of this invention includes molten ammonium nitrate containing very little moisture, e.g., 0.2 to 6 percent, of the type conventionally used to produce prilled and pelletized ammonium nitrate, and aqueous solutions of ammonium nitrate, e.g., those conventionally used to produce ammonium nitrate in crystal or granulated form. This aspect of the invention is directed primarily to the purer forms of ammonium nitrate, e.g., 90 percent and preferably 94 percent or higher, whose physical instability is particularly great.

The dust and fines normally associated with prilled, granulated, pelletized, cast and other solid forms of ammonium nitrate are materially reduced when using as the starting liquid form of ammonium nitrate a liquid mixture of ammonium nitrate and an amount of boric acid, an ammonium salt thereof, an alkali metal salt thereof or a mixture thereof, which substantially eliminates the 113–124° F. ammonium nitrate II–IV crystal form transition. Also, with such mixtures, the undesirable 184° F. transition is eliminated as well as dusting produced at the 90° F. transition temperature. Ammonium nitrate of much greater storage stability is produced.

Boric acid and sodium borate are convenient to use although an ammonium salt of boric acid is sometimes preferred when the starting liquid mixture is produced by the ammoniation of nitric acid. Because of the free ammonia often present in ammonium nitrate during its manufacture, some or all of the boric acid, when it is used, is converted to an ammonium salt thereof. Crude commercially available forms of these boron compounds can be used. Although salt forms of boric acid other than the alkali metal and ammonium salts have not been investigated, it will be apparent others will be operable because they comprise the boric acid responsible for operability. Such other salts are thus equivalents of the alkali-metal and ammonium salts. Amounts of boron compound greater than 2.5 percent are soluble only to a limited extent in the conventional liquid forms of ammonium nitrate used to form particulate ammonium nitrate and do not ordinarily give better results. Therefore, the process ordinarily employs no more than 2.5 percent of the boron compound. If the ammonium nitrate contains no other additives, preferably at least 0.2 percent of the boron compound is used, e.g., 0.5–2.5 percent, preferably 1–2.0 percent. When other additives are used in conjunction with the boron compound, often substantially lesser amounts are required to achieve the same or better results.

The boron compounds used in this invention markedly reduce the adverse effect of II–IV ammonium nitrate crystal type transition, which is responsible for much of the fines and dust formed in particulate ammonium nitrate production, on the physical stability of the ammonium nitrate. However, it has less effect on the III–IV (90° F.) transition. Therefore, to further reduce dust formation, desirably other additives are incorporated in the starting mixture which function cooperatively or synergistically with the boron compound, e.g., zinc sulfate, ferric ammonium sulfate, potassium sulfate, potassium nitrate or one used in the above-listed patents. Generally, lesser amounts, e.g., 0.005 to 1.0 percent, preferably 0.005 to 0.5 percent, more preferably 0.01 to 0.5 percent, of the boron compound is used in conjunction with the more effective of these prior art additives Conversely substantially lesser amounts, e.g., 0.01 to 1.5 percent, of the prior art additives are required when used as a mixture with the boron compound than when used alone.

The ammonium salts of phosphoric acid, especially diammonium phosphate, function cooperatively and synergistically with the boron compounds to improve the stability of the ammonium nitrate, particularly with respect to III–IV transition. As illustrated by U.S. Patents 1,742,488, 2,019,713, 2,481,795 and 2,957,763, large amounts of ammonium phosphate are usually required to materially improve the stability of the ammonium nitrate. However, when used in conjunction with a boron compound very small amounts effectively improve the stability of the ammonium nitrate. Moreover, half as much or less of the boron compound is required to improve II–IV and III–IV transition stability. Preferably at least 0.01 percent, e.g., 0.05 to one percent, and more preferably about 0.1 to 0.75 percent, is employed. Larger amounts than 2.5 percent do not materially further improve stability. However, as described hereinafter, mixed ammonium nitrate fertilizers containing large amounts of ammonium phosphate are also stabilized with boric acid or its salts.

The ammonium salts of sulfuric acid, e.g., ammonium sulfate, also function synergistically and cooperatively with the boron compounds to improve the stability of the ammonium nitrate, particularly with respect to III–IV transition. Very small amounts, e.g., 0.001 to 1 percent, preferably 0.005 to 0.5 percent and more preferably about 0.005 to 0.1 percent, are effective in conjunction with the boron compound, of which lesser amounts are required in the mixture than when used alone. This is in contrast to the much larger amounts required to produce significant improvement in stability in the absence of the boron compound. See U.S. 1,698,793, 1,801,677 and 2,657,977. Amounts in excess of 1 percent do not impart a greater degree of stability to the ammonium nitrate and often impart a lesser than optimum stability and therefore are ordinarily not used. A ratio of boron compound to sulfate compound of from 10:1 to 25:1 appears to impart optimum stability although other ratios, e.g., from 30:1 to 1:25, can be used to advantage.

Superior results are obtained when both an ammonium salt of phosphoric acid and of sulfuric acid is used with the boron compound in the compositions and in the processes of this invention. By the use of such mixtures, all crystal transition points of ammonium nitrate which affect dust production and product stability can virtually be eliminated using a total of less than 2 percent of the mixture of additives. As a result, the production of dust and "fines" is markedly reduced and ammonium nitrate and ammonium nitrate compositions are obtained which are stabilized to a degree not heretofore obtainable. In such preferred mixtures, although up to 5 percent by weight of the three ingredients can be used to advantage to produce a stabilized ammonium nitrate composition, preferably from about 0.01 to 1.5 percent and more preferably about 0.1 to 0.75 percent is used. Using 0.01–0.75 percent of the boron compound, excellent results are obtained using 0.01 to 1.0 of the phosphate compound and 0.001 to 0.5 percent of the sulfate compound, i.e., up to 1.5 percent of the mixture of phosphate and sulfate compounds but preferably less than 0.25 percent. Although the highest degree of stabilization thus far achieved was with 0.5 $H_3BO_3$, 0.05 $(NH_4)_2SO_4$ and 1.0 $(NH_4)_2HPO_4$ (no cracked prills in over 600 III–IV transitions), excellent stabilization is also achieved with lesser amounts, e.g., 0.2, 0.01 and 0.2 percent, respectively, of these additives.

Lesser amounts, e.g., a total amount of about 0.02 to 0.15 or 0.2 percent, of the additives are required to markedly reduce the production of fines and dust than are required to achieve optimum storage stability. Thus, to improve production efficiency, as little as 0.001 percent ammonium sulfate and 0.01 percent each of the boron and phosphate stabilizers give significantly improved results whereas five to fifty or more times that amount are used to impart optimum storage stability to the product, i.e., so that the product contains at least 0.2 percent and preferably at least 0.4 percent total of the additives.

U.S. Patent 1,939,165 teaches the use of mixtures of ammonium phosphate and ammonium sulfate to stabilize ammonium nitrate. However, the use of such mixtures alone is less effective than when used in conjunction with the boron compound in accordance with this invention.

One or more of the boron, phosphate and sulfate compounds employed in this invention can be added to the starting liquid form of the ammonium nitrate or formed in situ by first adding boric, phosphoric and/or sulfuric acid thereto followed by addition of ammonia. The latter technique can be used when manufacturing ammonium nitrate from nitric acid. When the additives are used per se rather than being formed in situ in the ammonium nitrate melt or aqueous solution or in the mixture used to produce the ammonium nitrate, they can be added as a finely divided solid or as a pre-formed aqueous or molten ammonium nitrate solution. Whatever technique is used, for best results thorough mixing should be employed to ensure a homogeneous mixture is obtained.

Two factors affect the degree of stabilization achieved with the stabilizing compositions of this invention, both with substantially pure ammonium nitrate and with the ammonium nitrate-containing compositions of this invention. The first factor is the pH of the ammonium nitrate. If the pH is too high, i.e., so that free ammonia is present in or released from the ammonium nitrate mixture, or if the pH is too low, so that free acid is present in the mixture, improvement in stability is substantially reduced. The optimum pH for any selected stabilizing composition can readily be determined by the stability tests described hereinafter. It varies with the selected stabilizing composition, but usually is between 5.0 and 7.0 (as an 8 percent by weight solution). For example, using 0.2 percent boric acid, 0.01 ammonium sulfate and 0.2 percent diammonium phosphate stabilizing composition, the optimum final pH of the ammonium nitrate is about 5.6 to 6.5 whereas at lower levels the optimum pH drops accordingly and approaches 5.0 at very low levels. The second factor is the manner in which the additives composition is formed and added to the mixture. When using a combination of boric acid, phosphoric acid and sulfuric acid to form the additives, the phosphoric acid must be converted to an ammonium salt before being mixed with free boric acid. A preferred technique involves ammoniating a mixture of phosphoric acid and sulfuric acid in the selected proportion until a pH is reached whereby all the phosphoric and sulfuric acid is converted to an ammonium salt. Boric acid is then added thereto and the mixture again ammoniated to a pH above 5.0. If concentrated acids are used, e.g., 93 percent sulfuric and 85 percent phosphoric, the resulting mixture is a slurry which can be pumped into the ammonium nitrate composition to be stabilized. This procedure is particularly advantageous with prilled ammonium nitrate because it does not increase the load on the evaporators and thus does not adversely affect plant capacity.

The following is a description of the manner and process of making and performing the invention, with particular reference to ammonium nitrate mixed compositions.

Particulate mixed fertilizer compositions which comprise ammonium nitrate, like substantially pure ammonium nitrate, are also susceptible to the production of dust and fines during manufacture and to physical deterioration during storage due to its ammonium nitrate content. Ammonium nitrate-ammonium phosphate mixed fertilizers, e.g., 27 percent $NH_4NO_3$, 22.5 percent KCl, 40.5 percent $(NH_4)_2PO_4$; 27 percent $NH_4NO_3$, 22.5 percent KCl, 40.5 percent $NH_4H_2PO_4$; 36 percent $NH_4NO_3$, 54 percent $(NH_4)_2PO_4$; and 36 percent $NH_4NO_3$, 54 percent $NH_4H_2PO_4$, are among those which physically deteriorate to an undesirable extent on storage at summer temperatures which fluctuate repeatedly through the 90° F. III–IV crystal transition temperature of ammonium nitrate. These fertilizers usually deteriorate in less than 200 transitions, which means they cannot be stored a year without deterioration. Those fertilizers having substantial ammonium nitrate content, e.g., 25 percent or more, are particularly susceptible to deterioration on storage. However, fertilizers containing as little as 5 percent ammonium nitrate, e.g., those in which the ammonium nitrate is employed as a separate ingredient, either as a coating or a core, in conjunction with other fertilizer ingredients, are also susceptible to physical deterioration on summer storage due to the presence of the ammonium nitrate.

These mixed fertilizers, like substantially pure ammonium nitrate, are stabilized by the presence of boric acid or an ammonium or alkali-metal salt thereof in intimate crystal mixture therewith. This results in reduced production of fines and dust during manufacture and less physical deterioration on storage.

Boric acid or its salts alone has less pronounced effect upon the stabilization of these mixed fertilizers than it does on substantially pure ammonium nitrate because the fertilizers are already partially stabilized by being in the form of a mixture. More profound stabilization effects are achieved if the mixed fertilizer also contains monoammonium or diammonium phosphate. Thus, the mixed fertilizers in which one or both of these phosphates are a significant ingredient, e.g., from 25 to 60 percent, are stabilized very well with boric acid or one of its salts.

About the same amounts of boric acid or its salts are required in the case of mixed fertilizers to achieve optimum stabilization as in the case of substantially pure ammonium nitrate.

As in the case of substantially pure ammonium nitrate, outstanding stabilization is achieved if the ammonium nitrate of the mixed fertilizer is in intimate physical mixture with both monoammonium or diammonium phosphate and ammonium sulfate. As in the case of substantially pure ammonium nitrate, only small amounts of the ammonium sulfate are required to markedly increase the stabilizaiton achieved with it alone or with boric acid alone.

The following examples further describe and illustrate the invention. Percentages and parts are by weight.

EXAMPLE 1.—GRANULAR AMMONIUM NITRATE PRODUCTION

Granular samples of pure ammonium nitrate were prepared by a conventional granulation process and their moisture absorption properties compared with granular ammonium nitrate samples prepared in the same manner from a mixture with 0.5 percent boric acid, 1 percent diammonium phosphate (DAP) and 0.05 percent diammonium sulfate. The samples were placed on watch glasses positioned one inch above a tank of water at 105° F. A cover was placed over the tank and samples were removed after 5, 10, 15, 20 and 25 minutes. The samples were tested for moisture content by the Karl Fischer method. The following data obtained by this procedure shows the moisture absorption rate of ammonium nitrate containing the diammonium phosphate, ammonium sulfate and boric acid is much less than the moisture absorption rate of the ammonium nitrate alone.

TABLE I.—PERCENT MOISTURE

| Minutes Exposed To Moisture | $NH_4NO_3$ Alone | $NH_4NO_3$+0.5 Boric Acid+1.0 percent DAP+0.05 $(NH_4)_2SO_4$ |
|---|---|---|
| 0 | 0.0 | 0.0 |
| 5 | 1.16 | 1.02 |
| 10 | 1.50 | 1.32 |
| 15 | 2.35 | 1.61 |
| 20 | 2.96 | 2.06 |
| 25 | 3.37 | 2.30 |

EXAMPLE 2.—PRILLED AMMONIUM NITRATE PRODUCTION

The following procedure was used to produce ammonium nitrate prills.

Melt 25 grams of conventional pure ammonium nitrate prills containing 0.3 percent moisture in a 100 ml. beaker. With the temperature of the molten solution at about 340° F. mix thoroughly therewith 0.25 gram of diammonium phosphate crystals, 0.125 gram of boric acid crystals and 0.012 gram of ammonium sulfate crystals. Convert the resulting solution into prills using a dropper with a capillary end to drop droplets of the mixture onto a sheet of Teflon polyfluorohydrocarbon maintained at 75° F. As a control, prepare another batch of prills in the same manner without additives. The prills are then tested for breakage resistance to impact, moisture absorption rates, prill breakage resulting from the prills being repeatedly passed rapidly through the II–IV transition range and repeatedly passed through the 90° F. transition point. These tests are described below. By cooling molten ammonium nitrate while noting time vs. temperature, the effect on the 90° F., 113 to 124° F. and/or 184° F. transition points can be shown.

*Impact tests.*—The impact test consists of placing 10 prills on a rotary platform and dropping a 6.2 gram flat ended glass rod a distance of 1 inch onto each prill. Each prill is examined after each impact and the number of prills cracked by the impact noted. This procedure is repeated until all prills are cracked. The following table shows the improved resistance to impact of the ammonium nitrate prills of this invention prepared in the manner described above.

TABLE II.—NO. PRILLS BROKEN (OF 10)

| Times Plunger Dropped | $NH_4NO_3$ Alone | $NH_4NO_3$+0.5% $H_3BO_3$+1.0% DAP+0.05% $(NH_4)_2SO_4$ |
|---|---|---|
| 1 | 1 | 0 |
| 2 | 3 | 0 |
| 3 | 7 | 0 |
| 4 | 10 | 0 |
| 5 |  | 0 |
| 6 |  | 2 |
| 7 |  | 2 |
| 8 |  | 3 |
| 9 |  | 4 |
| 10 |  | 4 |
| 11 |  | 5 |
| 12 |  | 5 |
| 13 |  | 6 |
| 14–21 |  | 8 |
| 22–30 |  | 9 |
| 31 |  | 10 |

*Prill breakage from passing directly between Forms II and IV.*—The prills described above were rapidly heated to 200° F., held there for 2 hours, then rapidly cooled to 110° F. and held there for 2 hours. Under such conditions ammonium nitrate normally changes directly from form II to form IV and vice versa. This procedure was repeated numerous times. Although ammonium nitrate does not ordinarily pass through the II–IV transition more than 4 times, the resistance of the prills to cracking upon passing a multiplicity of times through this transition was found to be directly correlated to the percent dust and fines produced in production. Data obtained by these tests are shown in Table III below. After only 6 transitions the pure ammonium nitrate prills began to break down and by 52 transitions all of these prills had shown significant cracking and formation of grainy structure. The prills containing the boric acid, diammonium phosphate (DAP) and $(NH_4)_2SO_4$ showed neither cracking nor weak grainy structure. Even after 130 transitions only 8 percent of these prills were cracked, as shown below.

TABLE III.—PERCENT PRILLS CRACKED

| No. of II–IV Transitions | $NH_4NO_3$ Alone | $NH_4NO_3$+1% DAP+ 0.5% $H_3BO_3$+0.05% $(NH_4)_2SO_4$ |
|---|---|---|
| 2 | 0 | 0 |
| 6 | 2 | 0 |
| 12 | 4 | 0 |
| 14 | 6 | 0 |
| 18 | 14 | 0 |
| 20 | 16 | 0 |
| 22 | 20 | 0 |
| 24 | 36 | 0 |
| 26 | 40 | 0 |
| 28 | 46 | 0 |
| 30 | 50 | 0 |
| 32 | 56 | 0 |
| 34 | 58 | 0 |
| 36 | 60 | 0 |
| 38 | 68 | 0 |
| 40 | 76 | 0 |
| 42 | 90 | 0 |
| 44 | 92 | 2 |
| 46 | 94 | 2 |
| 48 | 96 | 4 |
| 50 | 98 | 4 |
| 52 | 100 | 4 |
| 70 |  | 4 |
| 72 |  | 8 |
| 76 |  | 8 |
| 130 |  | 8 |

*Prill breakage from passing through the 90° F. transition.*—The above described prill samples are heated 2 hours at 110° F. and then cooled to 78° F. for 2 hours. This procedure is repeated numerous times. Because ammonium nitrate on storage passes through this transition temperature up to 200 times or more a year, this test directly establishes the storage stability of the ammonium nitrate. As shown in Table IV below, pure ammonium nitrate prills begin to crack after 6 transitions and after 36 transitions, all of these prills were cracked. The ammonium nitrate prills containing the boric acid, DAP and $(NH_4)_2SO_4$ showed no cracking even after 450 or more transitions.

TABLE IV.—PERCENT PRILLS CRACKED

| No. of No. of 90° Transitions | $NH_4NO_3$ Alone | $NH_4NO_3$+1% DAP+ 0.5% $H_3BO_3$+0.05% $(NH_4)_2SO_4$ |
| --- | --- | --- |
| 2 | 0 | 0 |
| 4 | 0 | 0 |
| 6 | 8 | 0 |
| 8 | 10 | 0 |
| 10 | 10 | 0 |
| 12 | 12 | 0 |
| 14 | 16 | 0 |
| 16 | 18 | 0 |
| 18 | 34 | 0 |
| 20 | 52 | 0 |
| 22 | 76 | 0 |
| 24 | 90 | 0 |
| 26 | 92 | 0 |
| 28 | 94 | 0 |
| 30 | 96 | 0 |
| 32 | 98 | 0 |
| 34 | 98 | 0 |
| 36 | 100 | 0 |
| 38 to 450 |  | 0 |

*Elimination of 184° F. transition point.*—Ammonium nitrate containing 0.3 percent moisture was heated to 340° F. and 1 percent diammonium phosphate, 0.5 percent boric acid and 0.05 percent ammonium sulfate was thoroughly mixed with the molten ammonium nitrate. The mixture was then cooled and the temperature versus time data plotted along with the same data for the molten ammonium nitrate only. The first break in this latter curve came at about 326° F., which was the freezing point of the ammonium nitrate; the second at about 255° F., which was the transition point of the ammonium nitrate as it changed from form I to form II crystals; and the third at about 177° F., which is the point at which the crystals changed from form II to form III. The curve of the ammonium nitrate containing the boric acid, DAP and $(NH_4)_2SO_4$ showed a break at 322° F., which was its freezing point and a break at 248° F., which was the form I to form II transition point. (This lowering of the freezing point and spread of the I-II transition point from it is a definite advantage in prilling.) The undesirable crystal transition which normally occurs around 184° F. was eliminated.

EXAMPLE 3.—PRILLED AMMONIUM NITRATE PRODUCTION

A run was made in an ammonium nitrate prill plant in which a powdered mixture of two parts of diammonium phosphate and ammonium sulfate (as an 18–46–0 fertilizer prepared from wet process phosphoric acid by ammoniation), and one part of boric acid was added to a stream of a molten ammonium nitrate containing from 4.5 to 1.7 percent water, which was varied during the test. The resulting mixed solution was prilled in the prilling tower. The prills were passed through rotary drying drums to remove moisture, through a cooler, through a coating drum where the prills were coated with approximately 3 percent powdered diatomaceous earth, and then bagged and placed in storage.

During the test the operating conditions in the plant were varied to determine product quality, operating problems and dust formation produced in the plant as conditions were varied.

The ammonium nitrate passing a 20 mesh screen after leaving the prilling tower and also after leaving the cooler is considered dust which must be removed with scrubbing equipment. By reducing the amount of dust formed the amount of scrubbing water can be drastically reduced. This reduces the amount of water which must be evaporated and thus reducing operating costs. The only dust in the drying equipment during the tests was that caused by attrition or breakage caused by lumps which flake off the drum walls. Even this amount was significantly reduced during this test over that present during normal plant runs. During this plant run, there was no transition point breakage of prills. In a normal run, there is always a considerable amount of half prills and fragments and dust present throughout the system.

(a) In this run, 2.7 percent of the powdered mixture described above was added to an ammonium nitrate solution containing 2.8 percent water. Spray temperature was 302° F. The prills left the prilling tower at about 185–195° F. The prills were dried with 217° F. hot air in a predryer. The prills left the predryer at this temperature and were dried with 223° F. hot air in a dryer. The prills left the dryer at approximately 184–188° F. The prills were cooled in a cooler with 95° F. air.

The prills had excellent handling qualities in the prilling tower and drying equipment and there was a marked reduction in the amount of dust formed. Whereas the amount of ammonium nitrate leaving the prilling tower which passes a 20 mesh screen in a normal run averages 3.8 percent and rises to 5 percent in many instances, in this run only 1.3 percent passed the 20 mesh screen. During this test, the percent material leaving the cooler which passed a 20 mesh screen was only 0.8 percent, compared with a normal 7 to 20 percent range and 8.5 percent average.

(b) In this runs, one percent of the same boric acid and 18–46–0 fertilizer mixture was added to molten ammonium nitrate containing 2 percent water. The resulting solution was prilled at 308° F. The temperature of the prills at the bottom of the prilling tower was maintained at 187–205° F. The prills were dried in the predryer with 217° F. hot air and left the predryer at about 205° to 210° F. The prills were further dried in a dryer with 223° F. hot air and left the dryer at 203–207° F. The prills were cooled in the cooler with 95° F. air and left the cooler at 95–111° F. The prills were then screened and the minus 20 mesh material removed. The prills were then coated with about 3 percent diatomaceous earth and bagged.

During this run, the quantity of dust in the material leaving the prilling tower, which normally averages 3.8 percent and goes as high as 5 percent on many occasions, dropped to 1.2 percent. The material leaving the cooler which passed the 20 mesh screen dropped from a normal 8.5 percent to 1.2 percent.

Other evidence of the reduction in dust formation was the drop in concentration of the solution coming from scrubbers associated with the drying drums, the cooling drum and the fines screen. The concentration of ammonium nitrate in the predryer scrubber dropped from 69 to 57 percent, in the dryer scrubber from 62 to 54 percent and in the cooler scrubber from 63 to 62 percent. The concentration of the solution of the material passing through the fines screen dropped from 71.7 percent to 61 percent.

(c) In this run, the same additive in the same proportions was added to molten ammonium nitrate containing 4.4 percent water which was then prilled at approximately 280° F. Prills from the prilling tower were maintained at a temperature of about 166–171° F., dried in the predryer and with 175° F. air with the prills leaving the predryer at approximately 138° F. The prills were dried in the dryer with 215° F. hot air with the prills leaving the dryer at approximately 170–183° F. The prills were cooled in a rotary cooler with 65° F. air with the prills leaving the cooler at about 80° F.

During this run, the dust and fines leaving the prilling tower was about 2 percent or less. The prills made during the test were also considerably harder than normal prills as evidenced by the following tests: 100 grams of the prills which passed No. 8 mesh screen and retained on No. 10 mesh screen were placed on a No. 10 mesh screen along with steel balls and shaken on a Rotap machine for 30 minutes. The portions retained on each screen were then weighed. The following data obtained by this test compares normal prills and those made in the above-described run.

PERCENT MATERIAL RETAINED

| Screen Mesh | Normal Plant Run | Plant Tests Using Additives |
|---|---|---|
| No. 10 | 0.2 | 19.7 |
| No. 20 | 85.1 | 77.3 |
| Passing 20 | 14.7 | 3.0 |

The material retained on the 10 mesh screen indicates the proportion of prills not crushed by the steel balls, i.e., the hardness of the material. The material passing the 20 mesh screen indicates the tendency of the prills to produce dust in the plant. The following is the result of the same test run on prills which had aged 24 hours.

PERCENT MATERIAL RETAINED

| Screen Mesh | Normal Plant Run | Plant Tests Using Additives |
|---|---|---|
| No. 10 | 0.2 | 37.8 |
| No. 20 | 84.8 | 61.3 |
| Passing 20 | 15.0 | 0.9 |

These data show a vast improvement in the hardness of the prills produced in the above described run, compared with normal prills, after aging 24 hours. Only 0.9 percent of the material from the test run passed the 20 mesh screen. This indicates there would be much less prill breakage in storage and during handling for shipments and when loading and distributing the fertilizer on the farm in fertilizer distributors. Dust plugs the distributors, requiring the operator to stop and clean them which results in considerable lost time.

During the above-described test run, the concentration of the ammonium nitrate scrubbing solution from the predryer scrubber dropped from 60 to 56.8 percent; the concentration from the dryer dust collector dropped from 62.1 to 55.9 percent; the concentration from the cooler dust collector dropped from 63.2 to 54.1 percent, and the concentration from the tank beneath the fines screen dropped from 71.7 to 55 percent. When the addition of additives was discontinued and the plant returned to normal operation, the concentrations increased rapidly to normal levels.

(d) In this run 2.7 percent of a mixture of 2 parts of the ammonium phosphate-ammonium sulfate fertilizer (18-46-0) and one part boric acid was added to a molten NH₄NO₃ solution containing 3.5 percent water. The resulting solution was prilled at about 295° F. The prills left the tower at 160° to 174° F. They were first dried in a predryer at approximately 185° F., maintaining a prill temperature of 155° to 171° F., and then in a dryer at about 208° F., maintaining a prill temperature of 172–176° F. They were cooled in a rotary cooler at approximately 78° F., maintaining a prill temperature of about 80° F. The prills were screened to remove minus 20 mesh material, coated with about 3 percent diatomaceous earth, and bagged.

Tests were run to determine the resistance of the prills to thermal shock through the II–IV (113°–124° F.) and III–IV (90° F.) transitions. In the III–V transition tests, 25–50 prills were placed in a drying cup in an oven at 200° F. for two hours. They were then rapidly cooled to 110° F. for two hours. In the III–IV transition tests, 25–50 prills in a drying cup were maintained at 110° F. for two hours and then at about 78–80° F. for 2 hours. The percent prills cracked at each test were recorded after each cycle. With unstabilized ammonia nitrate, 18 and 52 II–IV transitions and 8 and 36 III–IV transitions were required to break 10 percent and 100 percent, respectively, of the prills. With the stabilized ammonium nitrate no breakdown had occured in over 100 II–IV or III–IV transitions.

EXAMPLE 4.—AMMONIUM NITRATE PRILLS

NH₄NO₃ prills (0.2 percent H₂O) were melted and various percentages of diammonium phosphate (DAP), boric acid, and ammonium sulfate (DAS) were blended in the melt. The molten mixture was then dropped with a dropper onto a Teflon sheet to form prills and cooled. These prills were tested for resistance to breakage from cycling through the II–IV (113°–124° F.) and III–IV (90° F.) transitions.

In the II–IV transition tests prills were heated at 200° F. for two hours and then at 110° F. for two hours. In the III–IV transition tests prills were heated at 110° F. for two hours and then cooled to about 78° F. for two hours. The percent prills cracked in each test were recorded after each cycle. These data are tabulated in the following Tables V and VI.

TABLE V.—PERCENT NH₄NO₃ PRILLS CRACKED BY 124–113° F. THERMAL SHOCK (II–IV)

| PERCENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| H₃BO₃ | | 0.2 | 0.5 | 1.0 | 0.02 | 0.1 | 0.2 | 0.2 | 0.5 | 0.5 | 0.01 | 0.05 | 0.1 | 0.2 | 0.2 | 0.3 |
| (NH₄)₂SO₄ | | | | | 0.5 | 0.5 | 0.05 | 0.2 | 0.02 | 0.05 | 0.001 | 0.005 | 0.01 | 0.01 | 0.02 | 0.03 |
| (NH₄)₂HPO₄ | | | | | | | | | | | 0.02 | 0.1 | 0.2 | 0.2 | 0.4 | 0.6 |
| Transitions: | | | | | | | | | | | | | | | | |
| 10 | 2 | 0 | 0 | 0 | 0 | 0 | 0 | 0 | 0 | 0 | 0 | 0 | 0 | 0 | 0 | 0 |
| 20 | 16 | 0 | 0 | 0 | 0 | 0 | 0 | 0 | 0 | 0 | 6 | 0 | 0 | 0 | 0 | 0 |
| 30 | 50 | 0 | 0 | 0 | 0 | 0 | 0 | 0 | 0 | 0 | 12 | 0 | 0 | 0 | 0 | 0 |
| 40 | 76 | 4 | 0 | 0 | 0 | 0 | 0 | 0 | 0 | 0 | 18 | 2 | 0 | 0 | 0 | 0 |
| 50 | 98 | 24 | 0 | 0 | 0 | 0 | 0 | 0 | 0 | 0 | 52 | 6 | 2 | 0 | 0 | 0 |
| 60 | 100 | 58 | 4 | 0 | 6 | 4 | 2 | 4 | 0 | 0 | 62 | 6 | 2 | 0 | 0 | 0 |
| 70 | | 90 | 6 | 0 | 14 | 8 | 4 | 4 | 4 | 0 | 72 | 12 | 2 | 0 | 0 | 0 |
| 80 | | 100 | 12 | 4 | 18 | 12 | 10 | 8 | 2 | 0 | 78 | 16 | 2 | 0 | 0 | 0 |
| 90 | | | 28 | 16 | 28 | 20 | 16 | 12 | 14 | 0 | 94 | 28 | 4 | 4 | 0 | 0 |
| 100 | | | 48 | 24 | 40 | 32 | 24 | 18 | 16 | 0 | 100 | 40 | 4 | 6 | 0 | 0 |
| 110 | | | 72 | 32 | 52 | 44 | 42 | 34 | 42 | 2 | | 58 | 4 | 6 | 0 | 0 |
| 120 | | | 88 | 42 | 58 | 56 | 54 | 42 | 68 | 6 | | 62 | 4 | 8 | 0 | 0 |
| 130 | | | 98 | 54 | 76 | 68 | 62 | 52 | 76 | 8 | | 68 | 4 | 8 | 2 | 0 |
| 140 | | | 100 | 62 | 88 | 78 | 76 | 66 | 84 | 10 | | 76 | 4 | 10 | 4 | 0 |
| 150 | | | | 74 | 98 | 92 | 94 | 82 | 90 | 28 | | 88 | 4 | 12 | 4 | 2 |
| 160 | | | | 100 | 100 | 98 | 100 | 98 | 96 | 46 | | 100 | 4 | 16 | 4 | 2 |
| 170 | | | | | | 100 | | 100 | 98 | 56 | | | 6 | 18 | 10 | 6 |
| 180 | | | | | | | | | 100 | 68 | | | 12 | 22 | 14 | 10 |
| 190 | | | | | | | | | | 86 | | | 18 | 26 | 14 | 12 |
| 200 | | | | | | | | | | 98 | | | 20 | 26 | 16 | 12 |
| | | | | | | | | | | *100 | | | *100 | *100 | *100 | *100 |
| | | | | | | | | | | (*210) | | | (*270) | (*300) | (*280) | (*290) |

TABLE VI.—PERCENT NH₄NO₃ PRILLS CRACKED BY 90° F. THERMAL SHOCK (III-IV)

| PERCENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $H_3BO_3$ | | 0.2 | 0.5 | 1.0 | 0.02 | 0.1 | 0.2 | 0.2 | 0.5 | 0.5 | 0.01 | 0.05 | 0.1 | 0.2 | 0.2 | 0.3 |
| $(NH_4)_2SO_4$ | | | | | 0.5 | 0.5 | 0.05 | 0.2 | | 0.05 | 0.001 | 0.005 | 0.01 | 0.01 | 0.02 | 0.03 |
| $(NH_4)_2HPO_4$ | | | | | | | | | 0.02 | | 0.02 | 0.1 | 0.2 | 0.2 | 0.4 | 0.6 |
| Transitions: | | | | | | | | | | | | | | | | |
| 10 | 10 | 0 | 0 | 0 | 0 | 0 | 0 | 0 | 0 | 0 | 0 | 0 | 2 | 0 | 0 | 0 |
| 20 | 52 | 0 | 0 | 0 | 4 | 8 | 0 | 0 | 0 | 0 | 6 | 0 | 2 | 0 | 4 | 0 |
| 30 | 96 | 0 | 0 | 0 | 4 | 8 | 0 | 0 | 0 | 0 | 16 | 0 | 4 | 0 | 4 | 0 |
| 40 | 100 | 2 | 0 | 0 | 8 | 12 | 2 | 0 | 4 | 2 | 26 | 2 | 4 | 0 | 4 | 0 |
| 50 | | 76 | 64 | 12 | 12 | 20 | 4 | 6 | 14 | 2 | 34 | 2 | 4 | 0 | 4 | 0 |
| 60 | | 100 | 94 | 34 | 34 | 38 | 10 | 12 | 18 | 2 | 48 | 2 | 4 | 0 | 4 | 0 |
| 70 | | | 100 | 68 | 84 | 88 | 22 | 26 | 38 | 2 | 56 | 2 | 4 | 0 | 4 | 0 |
| 80 | | | | 94 | 94 | 96 | 30 | 28 | 42 | 4 | 68 | 2 | 4 | 0 | 4 | 0 |
| 90 | | | | 100 | 94 | 98 | 46 | 38 | 50 | 10 | 76 | 2 | 4 | 0 | 4 | 0 |
| 100 | | | | | 96 | 98 | 56 | 48 | 54 | 12 | 96 | 2 | 4 | 0 | 4 | 0 |
| 200 | | | | | *100 | *100 | *100 | *100 | *100 | 84 | *100 | 22 | 8 | 4 | 4 | 0 |
| 300 | | | | | | | | | | *100 | | 30 | 12 | 4 | 6 | 0 |
| 400 | | | | | | | | | | | | 64 | 16 | 6 | 8 | 0 |
| 500 | | | | | | | | | | | | *100 | 26 | 14 | 10 | 4 |
| 600 | | | | | | | | | | | | | *100 | 28 | 38 | 12 |
| 700 | | | | | | | | | | | | | | *100 | *100 | 68 |
| 800 | | | | | | | | | | | | | | | | *100 |
| | | | | | (*130) | (*110) | (*180) | (*190) | (*200) | (*240) | (*110) | (*420) | (*590) | (*690) | (*660) | (*770) |
| Transitions to break 10% or more | 10 | 50 | 50 | 50 | 50 | 40 | 60 | 60 | 50 | 90 | 30 | 170 | 250 | 430 | 440 | 590 |

EXAMPLE 5.—STABILIZED MIXED FERTILIZER PRILLS

Weigh the amounts of $NH_4H_2PO_4$[M.A.P.] and/or $(NH_4)_2HPO_4$[D.A.P.], $NH_4NO_3$, KCl, and water necessary to obtain the desired fertilizer formulation and mix thoroughly. Use about 10 percent water to avoid high ammonia loss during prill preparation. Heat the mixture gradually until it becomes molten. Introduce the selective additives to the molten mixture and stir until completely in solution. Measure the solution pH by diluting a 1 ml. sample with 100 ml. of distiller water. If a higher pH is desired, adjust by adding $NH_4OH$ (15 percent $NH_3$) dropwise until reaching the desired pH. If a lower pH is desired, adjust with dilute $H_3PO_4$ about 20 percent). Stabilization can be determined by placing molten droplets of mixture onto a Teflon sheet and letting them cool. On solidifying, the droplets become prills. Dry the prills in a drying tower using warm (120° F.) dry air. Dehumidify the air with 2 towers of drierite ($CaSO_4$). The prills should be dried to a moisture content of approximately 1.0 percent.

Conduct thermal shock tests at the III–IV (90° F.) $NH_4NO_3$ transition by heating 25 prills 2 hours at 110° F. and cooling 2 hours at 78°–80° F. Record the percentage of prills cracked after each complete cycle. One cycle consists of heating once and cooling once representing 2 crystalline transitions. In thermal shock tests at the II–IV (124° F.) $NH_4NO_3$ transition, heat 25 prills at 200° F. for 2 hours and at 110° F. for 2 hours. Record the percent prills cracked after each cycle.

The following example shows the preparation of a 36 percent $NH_4NO_3$, 54 percent D.A.P. fertilizer stabilized with 0.1 percent $H_3BO_3$. A 100 gram total sample basis was used so that the weights represent percent.

Weight 36.0 g. $NH_4NO_3$, 54.0 g. D.A.P., and 9.9 g. $H_2O$ in a 250 ml. breaker and mix. Place contents of breaker 10 percent cracking stability can be seen; 7 is 1.5 times more stable than 6; 13 and 14 are 10 times more stable than 8; and 18 is 3 times more stable than 15. Of con- on a hot plate, heat until molten, and add 0.1 g. $H_3BO_3$. Stir until all $H_3BO_3$ is in solution. Carry out prilling and drying operations as described above.

TABLE VII.—PERCENT MIXED FERTILIZER PRILLS CRACKED BY 124°F. THERMAL SHOCK (II-IV)

| PERCENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $NH_4NO_3$ | 27.0 | 27.0 | 27.0 | 27.0 | 27.0 | 27.0 | 27.0 | 36.0 | 36.0 | 36.0 | 36.0 | 36.0 | 36.0 | 36.0 | 36.0 | 36.0 |
| KCl | 22.5 | 22.5 | 22.5 | 22.5 | 22.5 | 22.5 | 22.5 | | | | | | | | | |
| $(NH_4)_2HPO_4$ | 40.5 | 40.5 | 40.5 | 40.5 | 40.5 | | | 54.0 | 54.0 | 54.0 | 54.0 | 54.0 | 54.0 | 54.0 | | |
| $NH_4H_2PO_4$ | | | | | | 40.5 | 40.5 | | | | | | | | 54.0 | 54.0 |
| $(NH_4)_2SO_4$ | | | 0.05 | 0.01 | 0.05 | | 0.05 | | 0.01 | | 0.05 | 0.01 | 0.05 | | 0.05 |
| $H_3BO_3$ | | 0.5 | | 0.1 | 0.5 | | 0.5 | | 0.1 | | 0.5 | | 0.1 | 0.5 | | 0.5 |
| Transitions: | | | | | | | | | | | | | | | | |
| 10 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 | 0 | 0 | 0 | 0 |
| 50 | 0 | 0 | 0 | 0 | 0 | 0 | 0 | 0 | 0 | 0 | 0 | 0 | 0 | 0 | 0 | 0 |
| 60 | 0 | 0 | 0 | 0 | 0 | 0 | 0 | 0 | 0 | 0 | 0 | 0 | 0 | 0 | 0 | 0 |
| 70 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 | 0 | 0 | 0 | 0 | 0 |
| 100 | 0 | 0 | 0 | 0 | 0 | 0 | 0 | 0 | 0 | 4 | 0 | 0 | 0 | 0 | 0 | 0 |
| 200 | 4 | 4 | 20 | 0 | 0 | 0 | 0 | 36 | 0 | 4 | 0 | 20 | 0 | 0 | 4 | 0 |
| 300 | 24 | 12 | 32 | 4 | 4 | 20 | 0 | *100 | 28 | *100 | 0 | 8 | 68 | 4 | 0 | 4 |
| 400 | 72 | 20 | 68 | 16 | 8 | 68 | 4 | | *100 | | *100 | *100 | *100 | 52 | *100 | 28 |
| 500 | *100 | 96 | *100 | 32 | 16 | *100 | 16 | | | | | | *100 | 60 | | 84 |
| 600 | | *100 | | *100 | 32 | | 60 | | | | | | | *100 | | *100 |
| 700 | | | | | 92 | | *100 | | | | | | | | | |
| | | | | | *100 | | | | | | | | | | | |
| | (*420) | (*510) | (*430) | (*570) | (*710) | (*430) | (*640) | (*290) | (*340) | (*300) | (*360) | (*320) | (*430) | (*540) | (*270) | (*510) |

TABLE VIII.—PERCENT MIXED FERTILIZER PRILLS CRACKED BY 90°F. THERMAL SHOCK (III-IV)

| PERCENT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $NH_4NO_3$ | 27.0 | 27.0 | 27.0 | 27.0 | 27.0 | 27.0 | 27.0 | 36.0 | 36.0 | 36.0 | 36.0 | 36.0 | 36.0 | 36.0 | 36.0 | 36.0 |
| KCl | 22.5 | 22.5 | 22.5 | 22.5 | 22.5 | 22.5 | 22.5 | | | | | | | | | |
| $(NH_4)_2HPO_4$ | 40.5 | 40.5 | 40.5 | 40.5 | 40.5 | | | 54.0 | 54.0 | 54.0 | 54.0 | 54.0 | 54.0 | 54.0 | | |
| $NH_4H_2PO_4$ | | | | | | 40.5 | 40.5 | | | | | | | | 54.0 | 54.0 |
| $(NH_4)_2SO_4$ | | | 0.05 | 0.01 | 0.05 | | 0.05 | | | 0.01 | | 0.05 | 0.01 | 0.05 | | 0.05 |
| $H_3BO_3$ | | 0.5 | | 0.1 | 0.5 | | 0.5 | | 0.1 | | 0.5 | | 0.1 | 0.5 | | 0.5 |
| Transitions: | | | | | | | | | | | | | | | | |
| 10 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 4 | 0 | 0 | 0 | 0 | 0 | 0 | 0 | 0 |
| 30 | 0 | 0 | 0 | 0 | 0 | 0 | 0 | 8 | 0 | 0 | 0 | 0 | 0 | 0 | 4 | 0 |
| 40 | 0 | 0 | 0 | 0 | 0 | 0 | 0 | 12 | 0 | 0 | 0 | 0 | 0 | 0 | 4 | 0 |
| 50 | 0 | 0 | 0 | 0 | 0 | 0 | 0 | 16 | 0 | 0 | 0 | 0 | 0 | 0 | 4 | 0 |
| 60 | 0 | 0 | 0 | 0 | 0 | 0 | 0 | 16 | 0 | 0 | 0 | 0 | 0 | 0 | 4 | 0 |
| 70 | 0 | 0 | 0 | 0 | 0 | 0 | 0 | 24 | 0 | 0 | 0 | 0 | 0 | 0 | 4 | 0 |
| 80 | 0 | 0 | 0 | 0 | 0 | 0 | 0 | 28 | 0 | 0 | 0 | 0 | 0 | 0 | 4 | 0 |
| 90 | 0 | 0 | 0 | 0 | 0 | 0 | 0 | 28 | 0 | 0 | 0 | 0 | 0 | 0 | 4 | 0 |
| 100 | 0 | 4 | 0 | 0 | 0 | 0 | 0 | 32 | 0 | 0 | 0 | 0 | 0 | 0 | 4 | 0 |
| 200 | 16 | 16 | 0 | 0 | 0 | 0 | 0 | 92 | 12 | 0 | 0 | 0 | 4 | 0 | 12 | 0 |
| 300 | 36 | 28 | 8 | 4 | 0 | 0 | 0 | *100 | 76 | 32 | 40 | 8 | 8 | 4 | 36 | 0 |
| 400 | 68 | 44 | 32 | 16 | 8 | 0 | 4 | | *100 | *100 | *100 | *100 | 36 | 12 | *100 | 8 |
| 500 | *100 | *100 | 84 | 32 | 20 | 16 | 28 | | | | | | 92 | 36 | | 36 |
| 600 | | | *100 | 72 | 68 | *100 | 84 | | | | | | *100 | *100 | | *100 |
| 700 | | | | *100 | *100 | | *100 | | | | | | | | | |
| | (*450) | (*500) | (*530) | (*680) | (*850) | (*540) | (*700) | (*220) | (*320) | (*340) | (*330) | (*370) | (*510) | (*580) | (*400) | (*550) |
| No. Transitions to Crack 10% | 160 | 150 | 310 | 330 | 460 | 360 | 510 | 40 | 200 | 280 | 260 | 310 | 310 | 390 | 190 | 430 |

An important indication of the improved storage stability of the ammonium nitrate compositions is the number of transitions required to produce 10 percent prill breakage. Experience has shown that most customer complaints with respect to commercial products involves products which have 10 percent or more cracked prills. Relating this to the data shown in Tables VI and VIII, it can be seen that conventional pure ammonium nitrate prills require only about 10 transitions to reach the undesirable level of 10 percent cracked prills whereas the novel stabilized prills can be stored two complete seasons without deterioration. Table VI shows an improvement from 10 transitions for the unstabilized ammonium nitrate (Formulation 1) to form 40 (Formulations 2, 3, 4 and 5) to beyond 400 transitions (Formulations 14, 15 and 16) for the stabilized ammonium nitrate before 10 percent cracking occurs, a 4 to greater than 40 times improvement in stability. In Table VIII, which shows improved storage stability of mixed fertilizers, comparing the unstabilized Formulation 1 with stabilized Formulations 4 and 5, a 2 to 3 times improvement in siderable commercial significance is the fact that Formulations 13–16 shown in Table VI could be storable for a full season (200 transitions) without significant deterioration. The storability without significant (10 percent) deterioration of the mixed fertilizer No. 1 shown in Table VIII was increased from a half season to 1.5 to two seasons (Nos. 4 and 5); No. 6 from two seasons to 3 seasons (No. 7); No. 8 from less than 30 days to 1.5 to 2 seasons (Nos. 13 and 14); and No. 15 from one season to two seasons.

Modifications and variations of the invention as described above will be apparent to and can be made by those skilled in the art and are therefore within the spirit of the invention.

What is claimed is:

1. A method for reducing the dust formation normally associated with particulate ammonium nitrate production in which a crystalline ammonium nitrate composition is subjected to a rapid temperature change which promotes an interchange of the ammonium nitrate crystalline form directly between Type II and Type IV, which comprises crystallizing the ammonium nitrate from a liquid mixture with boric acid, an alkali-metal salt thereof, an ammonium salt thereof, or a mixture thereof, in an amount sufficient to substantially reduce the sensitivity of the ammonium nitrate to II–IV crystal type transitions.

2. A method according to claim 1 wherein the liquid mixture also contains an ammonium salt of phosphoric or sulfuric acid, or a mixture thereof.

3. A method according to claim 2 wherein monoammonium or diammonium phosphate and up to one percent ammonium sulfate are present in the liquid mixture.

4. A method according to claim 3 wherein the liquid mixture contains up to 0.2 percent ammonium sulfate.

5. A method according to claim 4 wherein the liquid mixture contains at least 0.01 percent of the ammonium phosphate compound, from 0.001 to 0.1 percent of the ammonium sulfate and at least ten times the amount of the latter of the boron compound.

6. A method according to claim 5 wherein the boron compound is boric acid or an ammonium salt thereof and the liquid mixture contains from 0.005 to 0.1 percent ammonium sulfate.

7. A method according to claim 6 wherein the particulate ammonium nitrate is in the form of prills and the liquid mixture is molten ammonium nitrate of at least 90 percent purity.

8. A method according to claim 6 wherein the particulate ammonium nitrate is granular ammonium nitrate of at least 90 percent purity.

9. A method according to claim 3 wherein the ammonium nitrate composition is a mixed fertilizer containing monoammonium or diammonium phosphote.

10. A method according to claim 9 wherein the fertilizer contains at least 25 percent ammonium nitrate and at least 0.005 percent ammonium sulfate.

11. A method according to claim 10 wherein the boron compound is boric acid or an ammonium salt thereof and the fertilizer contains at least 25 percent monoammonium or diammonium phosphate.

12. A method according to claim 11 wherein the fertilizer is a granular fertilizer containing from 0.005 to 0.1 percent ammonium sulfate.

13. Stabilized ammonium nitrate of at least 90 percent purity as a crystallized mixture with an amount up to 2.5 percent of a boron compound selected from the group consisting of boric acid, alkali-metal salts thereof and ammonium salts thereof sufficient to substantially reduce the sensitivity of the ammonium nitrate to III–IV crystal type transitions.

14. Particulate ammonium nitrate according to claim 13 of at least 20 mesh particle size containing an ammonium salt of phosphoric or sulfuric acid or a mixture thereof.

15. Particulate ammonium nitrate according to claim 14 containing from 0.005 to 0.5 percent ammonium sulfate.

16. Prilled or granular ammonium nitrate according to claim 15 containing up to 0.1 percent ammonium sulfate and at least ten times the amount thereof of boric acid or an ammonium salt thereof.

17. Particulate ammonium nitrate according to claim 14 containing from 0.1 to one percent monoammonium or diammonium phosphate.

18. Prilled or granular ammonium nitrate according to claim 17 containing from 0.05 to one percent boric acid or an ammonium salt thereof and from 0.1 to 0.75 percent diammonium phosphate.

19. Ammonium nitrate compositions whose ammonium nitrate content renders the composition normally physically unstable to storage at temperatures which fluctuate through the III–IV ammonium nitrate crystal transition temperature, stabilized by (a) boric acid or an ammonium or alkali-metal salt thereof, (b) monoammonium or diammonium phosphate, and (c) ammonium sulfate, as a crystallized mixture with the ammonium nitrate.

20. Ammonium nitrate compositions according to claim 19 containing from 0.01 to 1.0 percent of (a), at least 0.01 percent of (b) and from 0.005 to 0.5 percent of (c).

21. Particulate ammonium nitrate compositions according to claim 20 of at least 20 mesh size consisting of at least 25 percent ammonium nitrate.

22. Particulate ammonium nitrate fertilizer compositions according to claim 21 containing boric acid or an ammonium salt thereof in an amount at least ten times that of the ammonium sulfate.

23. Prilled or granular ammonium nitrate mixed fertilizer compositions according to claim 22 consisting of at least 25 percent monoammonium or diammonium phosphate.

24. Ammonium nitrate compositions according to claim 19 consisting of at least 90 percent ammonium nitrate.

25. Particulate ammonium nitrate compositions according to claim 22 consisting of at least 90 percent ammonium nitrate.

26. Prilled or granular ammonium nitrate according to claim 25 containing (a) from 0.05 to 0.5 percent of boric acid or an ammonium salt of boric acid, (b) from 0.05 to one percent of monoammonium or diammonium phosphate and from 0.001 to 0.1 percent ammonium sulfate.

27. Prilled ammonium nitrate according to claim 26 containing at least 0.1 percent each of boric acid or ammonium salt thereof and diammonium phosphate and at least 0.005 percent ammonium sulfate.

28. A stabilizing composition for stabilizing ammonium nitrate consisting essentially of (a) boric acid or an ammonium salt thereof, (b) ammonium sulfate and (c) an ammonium salt of phosphoric acid in a weight ratio of from about 10:1:10 to about 20:1:20.

29. A composition according to claim 28 wherein the composition consists essentially of (a) boric acid, (b) diammonium phosphate and (c) ammonium sulfate.

References Cited by the Examiner
UNITED STATES PATENTS
2,657,977    11/1953    Stengel et al. _____ 23—103

OSCAR R. VERTIZ, *Primary Examiner.*

A. J. GREIF, *Assistant Examiner.*

UNITED STATES PATENT OFFICE
CERTIFICATE OF CORRECTION

Patent No. 3,317,276                          May 2, 1967

Marion Lipscomb Brown, Jr., et al.

It is hereby certified that error appears in the above numbered patent requiring correction and that the said Letters Patent should read as corrected below.

Column 2, line 44, for "drying cooling" read -- drying and cooling --; column 3, line 38, for "of 184° F." read -- of the 184° F. --; line 43, strike out "and ammonium nitrate"; column 7, line 10, for "stabilizaiton" read -- stabilization --; column 9, TABLE IV, in the heading to the first column, for "No. of No. of" read -- No. of --; column 10, line 26, for "runs" read -- run --; column 12, line 17, for "In the III-V" read -- In the II-IV --; columns 13 and 14, in TABLE VI, fifth column, line 6 thereof, for "34" read -- 38 --; column 13, line 37, for "distiller" read -- distilled --; column 14, line 42, beginning with "10 percent" strike out all to and including "Of con-" in line 44, same column 14; column 15, line 48, after "improvement in" insert -- 10 percent cracking stability can be seen; 7 is 1.5 times more stable than 6; 13 and 14 are 10 times more stable than 8; and 18 is 3 times more stable than 15. Of con- --; column 16, line 54, for "phosphote" read -- phosphate --.

Signed and sealed this 21st day of November 1967.

(SEAL)
Attest:

EDWARD M. FLETCHER, JR.                     EDWARD J. BRENNER
Attesting Officer                            Commissioner of Patents